US008086832B2

(12) United States Patent
Lichtensteiger et al.

(10) Patent No.: US 8,086,832 B2
(45) Date of Patent: Dec. 27, 2011

(54) STRUCTURE FOR DYNAMICALLY ADJUSTING PIPELINED DATA PATHS FOR IMPROVED POWER MANAGEMENT

(75) Inventors: Susan K. Lichtensteiger, Essex Junction, VT (US); Pascal A. Nsame, Colchester, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 11/869,216

(22) Filed: Oct. 9, 2007

(65) Prior Publication Data

US 2008/0028256 A1 Jan. 31, 2008

Related U.S. Application Data

(63) Continuation-in-part of application No. 11/419,388, filed on May 19, 2006, now abandoned.

(51) Int. Cl.
*G06F 7/38* (2006.01)
*G06F 9/00* (2006.01)
*G06F 9/44* (2006.01)
*G06F 13/24* (2006.01)
*G06F 9/46* (2006.01)

(52) U.S. Cl. ......... 712/244; 710/260; 718/107; 718/108

(58) Field of Classification Search ................... 712/244
See application file for complete search history.

(56) References Cited

U.S. PATENT DOCUMENTS

| | | | | |
|---|---|---|---|---|
| 5,434,520 A | * | 7/1995 | Yetter et al. | 326/93 |
| 5,583,450 A | * | 12/1996 | Trimberger et al. | 326/41 |
| 5,590,368 A | | 12/1996 | Heeb et al. | |
| 5,651,013 A | | 7/1997 | Iadanza | |
| 5,734,285 A | * | 3/1998 | Harvey | 327/291 |
| 5,737,614 A | * | 4/1998 | Durham et al. | 713/322 |
| 6,009,477 A | | 12/1999 | Sarangdhar et al. | |
| 6,023,742 A | | 2/2000 | Ebeling et al. | |
| 6,216,223 B1 | * | 4/2001 | Revilla et al. | 712/245 |
| 6,362,676 B1 | * | 3/2002 | Hoffman | 327/295 |
| 6,530,010 B1 | * | 3/2003 | Hung et al. | 712/1 |
| 6,636,996 B2 | * | 10/2003 | Nowka | 714/727 |
| 6,836,877 B1 | * | 12/2004 | Dupenloup | 716/18 |
| 7,076,682 B2 | * | 7/2006 | Jacobson | 713/600 |
| 7,076,683 B2 | | 7/2006 | Jacobson | |
| 2003/0033594 A1 | | 2/2003 | Bowen | |
| 2004/0019765 A1 | * | 1/2004 | Klein, Jr. | 712/15 |
| 2004/0041813 A1 | | 3/2004 | Kim | |
| 2004/0107331 A1 | | 6/2004 | Baxter | |
| 2005/0076125 A1 | | 4/2005 | Weber et al. | |

OTHER PUBLICATIONS

Hartstein, A., et al "Optimum Power/Performance Pipeline Depth", Proceedings of the 36th International Symposium on Microarchitecture (MICRO-36 2003), IEE Computer Society.

(Continued)

*Primary Examiner* — Eddie P Chan
*Assistant Examiner* — William Partridge
(74) *Attorney, Agent, or Firm* — Cantor Colburn LLP; Michael LeStrange (57) ABSTRACT

A design structure embodied in a machine readable, non-transitory storage medium used in a design process includes a system for dynamically varying the pipeline depth of a computing device. The system includes a state machine that determines an optimum length of a pipeline architecture based on a processing function to be performed. A pipeline sequence controller, responsive to the state machine, varies the depth of the pipeline based on the optimum length. A plurality of clock splitter elements, each associated with a corresponding plurality of latch stages in the pipeline architecture, are coupled to the pipeline sequence controller and adapted to operate in a functional mode, one or more clock gating modes, and a pass-through flush mode. For each of the clock splitter elements operating in the pass-through flush mode, data is passed through the associated latch stage without oscillation of clock signals associated therewith.

9 Claims, 5 Drawing Sheets

OTHER PUBLICATIONS

Efthymiou, et al "Adaptive Pipeline Depth Control for Processor Power-Management", Proceedings of the 2002 IEEE International Conference on Computer Design: VLSI in Computers and Processors (ICCD '02), IEEE Computer Society.

Bartling, SC, Method to Maintain Pipeline Throughput while Pipeline Depth is Allowed to Vary [online]; [retrieved on Feb. 21, 2006]; retrieved from the Internet; IBM Technical Disclosure Bulletin, May 1996, pp. 31-32.

Jacobson; "Improved Clock-Gating Through Transparent Pipelining," ISLPED 2004; pp. 26-31.

Efthymiou et a; "Adaptive Pipeline Structures for Speculation Control," Proceedings of the Ninth International Symposium on Asynchronous Circuits and Systems (ASYNC'03) IEEE 2003.

* cited by examiner

| C | EN | OSC | ZB | ZC | |
|---|----|-----|----|----|--|
| 1 | 0 | 0 | 0 | 1 | AND Clock Gated |
| 1 | 0 | 1 | 0 | 1 | |
| 1 | 1 | 0 | 0 | 1 | Functional Mode |
| 1 | 1 | 1 | 1 | 0 | |
| 0 | 0 | 0 | 1 | 0 | |
| 0 | 0 | 1 | 1 | 0 | OR Clock Gated |
| 0 | 1 | 0 | 1 | 0 | |
| 0 | 1 | 1 | 1 | 0 | |

| | Inputs | | | Outputs | | |
| --- | --- | --- | --- | --- | --- | --- |
| F | C | EN | OSC | ZB | ZC | |
| 0 | 1 | 0 | 0 | 0 | 1 | AND Clock Gated |
| 0 | 1 | 0 | 1 | 0 | 1 | |
| 0 | 1 | 1 | 0 | 0 | 1 | Functional Mode |
| 0 | 1 | 1 | 1 | 1 | 0 | |
| 0 | 0 | 0 | 0 | 1 | 0 | OR Clock Gated |
| 0 | 0 | 0 | 1 | 1 | 0 | |
| 0 | 0 | 1 | 0 | 1 | 0 | |
| 0 | 0 | 1 | 1 | 1 | 0 | |
| 1 | 1 | 0 | 0 | 1 | 1 | Flush Mode |
| 1 | 1 | 0 | 1 | 1 | 1 | |
| 1 | 1 | 1 | 0 | 1 | 1 | |
| 1 | 1 | 1 | 1 | 1 | 1 | |
| 1 | 0 | 0 | 0 | 1 | 1 | |
| 1 | 0 | 0 | 1 | 1 | 1 | |
| 1 | 0 | 1 | 0 | 1 | 1 | |
| 1 | 0 | 1 | 1 | 1 | 1 | |

STRUCTURE FOR DYNAMICALLY ADJUSTING PIPELINED DATA PATHS FOR IMPROVED POWER MANAGEMENT

CROSS REFERENCE TO RELATED APPLICATION

This application is a continuation-in-part application of U.S. Ser. No. 11/419,388, filed May 19, 2006, the contents of which are incorporated by reference herein in their entirety.

BACKGROUND

The present invention relates generally to pipeline techniques in computer logic and, more particularly, to a design structure for dynamically adjusting pipelined data paths depending on the function/workload for improved power management.

Pipelining is a technique used in the design of microprocessors and other digital electronic devices to increase their performance. This technique generally refers to the concept of configuring various stages of logic in sequence, wherein data is initially introduced into the sequence of logic stages and then subsequently more data is introduced into the stages before completion of the operation on the first data through the sequence. Thus, pipelining reduces cycle time of a processor and hence increases instruction throughput, the number of instructions that can be executed in a unit of time. Pipelining came about sometime in the mid-1950's, when it was realized that most of the valuable circuitry of a computer was sitting idle during a computation. For example, after a memory fetch, the memory would be idle while the central processing unit (CPU) decoded an instruction, and after decode, the decode circuitry would sit idle during execution. After execution, still more idle time would result while the results were written into memory.

However, pipelines of large depths also have certain disadvantages associated therewith. For instance, when a program branches, the entire pipeline must be flushed. Also, the optimum pipelining depth varies for different classes of workloads. Where a particular function is not being repeated, no performance gain exists at that point by having multiple pipeline stages. Moreover, each stage of the pipeline is still individually clocked, thereby expending unnecessary power. Registers and corresponding clock trees are responsible for an increasingly large fraction of total gate count and power dissipation.

Accordingly, it would be desirable to be able to manage and adapt pipelined data paths to application requirements in order to efficiently cope with variability of data rates with respect to power dissipation.

SUMMARY

The foregoing discussed drawbacks and deficiencies of the prior art are overcome or alleviated by a design structure embodied in a machine readable medium used in a design process, the design structure including a system for dynamically varying the pipeline depth of a computing device, depending upon at least one of computing function and workload, the system further comprising a state machine configured to determine an optimum length of a pipeline architecture based on a processing function to be performed; a pipeline sequence controller, responsive to the state machine, the pipeline sequence controller configured to vary the depth of the pipeline based on the determined optimum length; and a plurality of clock splitter elements, each associated with a corresponding plurality of latch stages in the pipeline architecture, the clock splitter elements coupled to the pipeline sequence controller and adapted to operate in a functional mode, one or more clock gating modes, and a pass-through flush mode; wherein, for each of the clock splitter elements operating in the pass-through flush mode, data is passed through the associated latch stage without oscillation of clock signals associated therewith.

BRIEF DESCRIPTION OF THE DRAWINGS

Referring to the exemplary drawings wherein like elements are numbered alike in the several Figures.

DETAILED DESCRIPTION

Disclosed herein is a design structure for dynamically adjusting pipelined data paths for improved power management. Briefly stated, the concepts of "always on" clocking and variable pipeline depth are introduced, wherein the pipeline definition is constantly varied depending on the function/workload. Registers and corresponding clock trees are responsible for an increasingly large fraction of the total gate count and power dissipation of a processing device. Because modern processors are optimized for maximum performance, pipeline stages are optimized for the critical path. Accordingly, a large amount of unnecessary work can result from clocking the instructions entering the pipeline. Advantageously, the nature of continuous pipelining is such that it has the potential to save power for applications that do not expose the processor critical path. As set forth in further detail herein, up to about 75% of the power may be managed/saved architecturally using root clock and/or leaf clock gating and/or clock flushing techniques.

Figure 1:
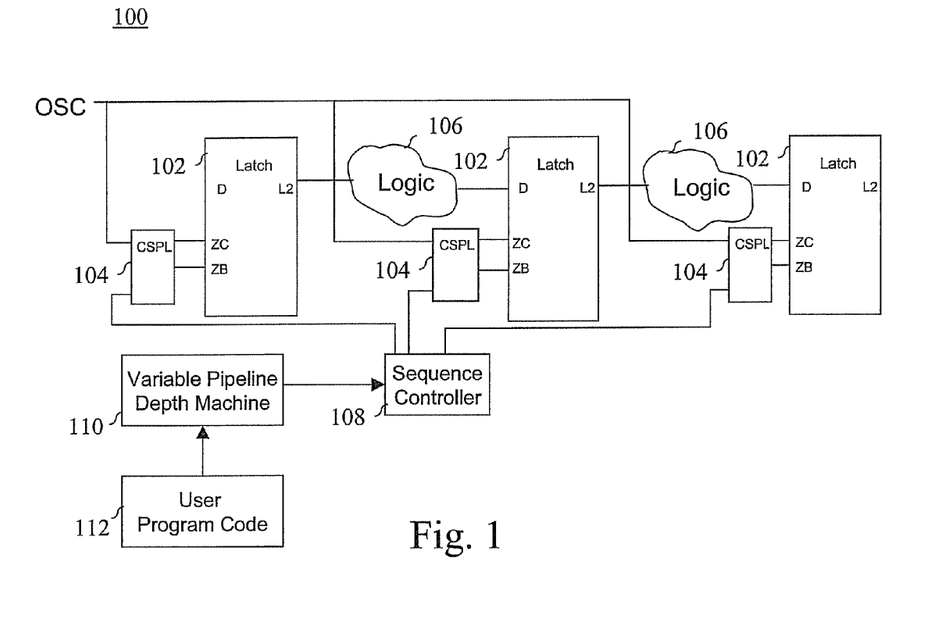
FIG. 1 is a schematic diagram of a plurality of latches configured within a processing pipeline architecture, in accordance with an embodiment of the invention.

Referring initially to FIG. 1, there is shown a schematic diagram of a plurality of latch stages configured within a processing pipeline architecture 100, in accordance with an embodiment of the invention. In an exemplary embodiment, the latch stages 102 (also referred to herein simply as "latches") are configured as two-stage LSSD (level sensitive scan design) latches, although other configurations are possible. Each of the LSSD latches 102 are associated with a local clock splitting device 104, which derives the local "B" and "C" clock signals from the system clock (OSC) used by the LSSD latches 102, as will be recognized in the art.

Accordingly, FIG. 1 further illustrates a sequence controller 108 in communication with the clock splitters 104, which allows for a flush (pass-through) mode of clocking that propagates data through the specifically flushed latch stages. As described below, the sequence controller generates a flush mode enable signal that, when active, creates an "always gated condition" for the B and C clocks of the LSSD latches 102. In order to determine when the flush mode is appropriate, a state machine 110 is configured in communication with the sequence controller. The state machine 110 detects upcoming process cycles in which a particular function is not needed, or which represents a repeating cycle wherein the pipeline depth may be dynamically reduced and data flushed therethrough. Processing functions may be grouped by architecture design/compiler creation into specific operations executed such as "add," "subtract," "multiply," "store," etc.

Nominally, a typical function may require multiple pipeline stages to complete the total execution thereof. On the other hand, a simple function such as a single multiply (for example) may be kept non-pipelined. However, a performance penalty would exist for back-to-back multiply operations. As such, pipeline stages are dynamically added to the present architecture such that the multiply (or any function) will allow for staged launches of the function. Thus, even though the first multiply takes the same duration, once the pipeline stages are filled, multiply operations are occurring (N/pipeline depth) in time. If the function is not being repeated, then no performance gain exists using the pipeline stages. When such a condition exists, the splitter flush signal from the sequence controller 108 may be activated.

A particularly suitable means of determining the case of a single use function versus a multiple repeating function is through the system compiler. The compiler can look ahead to the instruction stream, and by determining whether a function pipeline set is being repeatedly or singularly used, can mark the instruction (via a prefix bit, for example). Upon execution of fetching and predecoding the incoming instructions from the user program code 112, the dispatcher will be directed by the instruction bit to either run in a normal pipeline mode, or the clock splitter flush mode.

Alternatively, the system hardware may be used to monitor the instructions as they are being fetched from the memory device or storage location of the user program code 112. The hardware look ahead can evaluate the same scenarios as a compiler, and mark the flush/or pipe control bits to be stored along with the instructions. For example, it may be assumed that the prefetching unit of the system CPU has marked the memory of the on-chip cache (plus the local scratch space for the first fetch) with the prefix bit of an instruction as being "pipeline" or "flush execute." As the marked instruction is decoded, the variable depth pipeline state machine 110 is updated with incoming instructions that are marked as "flush", for example, along with the pipe sequencer IDs as provided from the decode stage. A pipeline start will be provided by the instruction decode, along with a tag of depth of "flush" for an incoming instruction.

A "depth" of the flush refers to the number of pipeline stages that are set in the flush mode for each instruction that has been marked as a flush. The state machine 110 keeps track of the start of a flush instruction, and thereafter a "lock pipeline" mode. Upon the start of the first pipeline cycle, the sequence controller 108 is given a "start flush" state by the state machine 110. The sequence controller 108 will then activate the appropriate signals to the clock splitter devices 104 to place the pipeline in flush mode. The state machine keeps 100 the sequence controller 108 in each pipeline stage active until the full function completes. Since this is a flush mode, the switch is an on/off switch. The length of the pipelines involved is encoded from the instruction. Thus, the sequence keeps track of two key inputs from each instruction in the user program code 112: (1) the starting pipeline to signal the dedicated sequencer, and (2) the length or depth of the pipeline for the flushed instruction function, or how long the flush is active to complete the function.

One skilled in the art will recognize that more than one instruction may be active in a super scalar architecture. Accordingly, the pipeline controller would track N separate instructions.

Figure 2A:
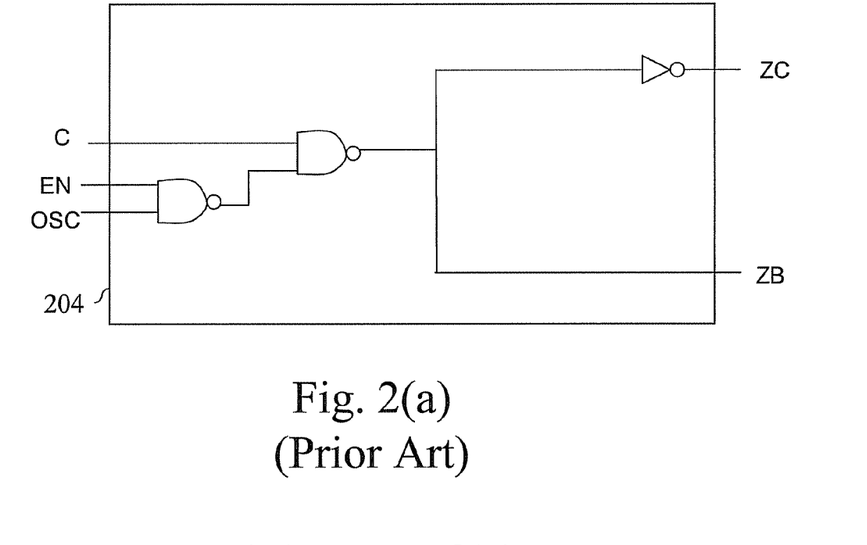
FIG. 2(a) is a schematic diagram of a conventional clock splitting device for pipeline architectures.
Figure 2B:
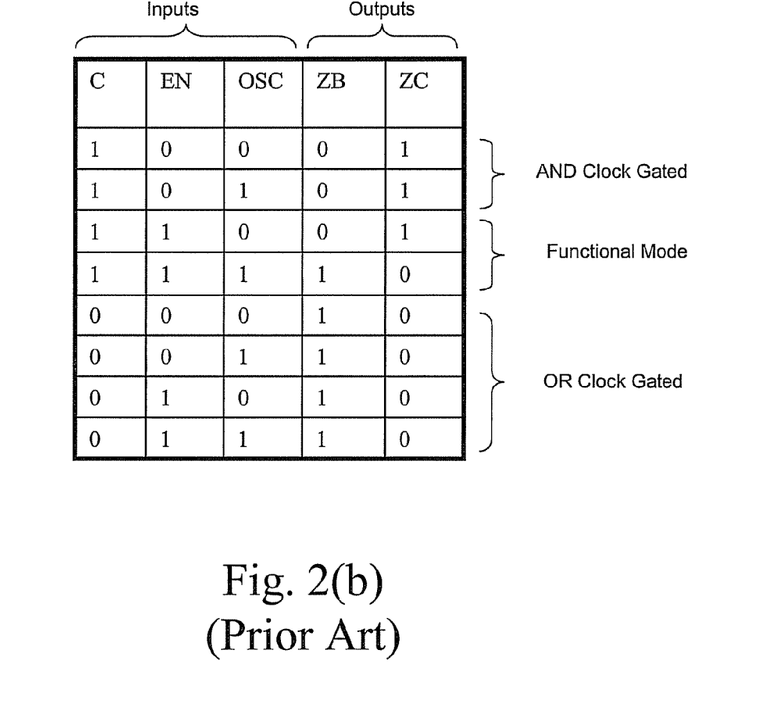
FIG. 2(b) is a truth table illustrating the operation of the conventional clock splitting device shown in FIG. 2(a)

Referring now to FIGS. 2(a) and 2(b), the operation of the sequence controller 108 and modified clock splitting devices 104 in FIG. 1 will be appreciated upon initial consideration of a conventional clock splitting device 204 shown in FIG. 2(a). As is shown, the splitter 204 receives as inputs signal "C," enable signal "EN" and system clock "OSC." Output signal of the clock splitting device are the local C clock "ZC" (for L1 of the LSSD latch) and the local B clock "ZB" (for L2 of the LSSD latch). So long as the input signal C is high and the enable signal EN is high, then the B clock ZB tracks the system clock OSC, with the C clock tracking the inverted value of OSC. This mode of operation is the functional mode of operation, as shown in the truth table of FIG. 2(b), wherein data is propagated through the latch stages.

If input signal C is active, but the enable signal EN is not active, then the B clock is held at logic level 0 while the C clock is held at logic level 1, regardless of the value of the system clock OSC. This is referred to as AND clock gating, and represents a non-functional mode of operation of the architecture wherein data is not propagated through the latch stages. Moreover, if input signal C is not active, then regardless of the state of the enable signal EN or the system clock OSC, the B clock is held at logic 1 and the C clock is held at logic 0. This is another non-functional mode of operation referred to as OR clock gating.

As can be seen, if the conventional clock splitter is in a functional mode, the B and C clocks are in continuous operation, propagating data through the latches in a pipeline fashion. However, as stated above, there is no means of circumventing pipelined propagation where not needed without also placing the architecture in a deactivated state.

Figure 3A:
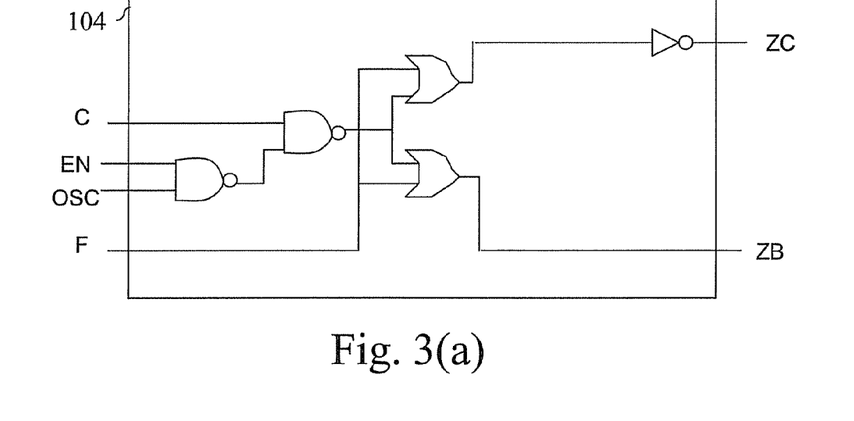
FIG. 3(a) is a schematic diagram of the modified clock splitting device shown in FIG. 1, configured to provide a flush mode of clocking that propagates data through the flushed latch stages in the architecture.
Figure 3B:
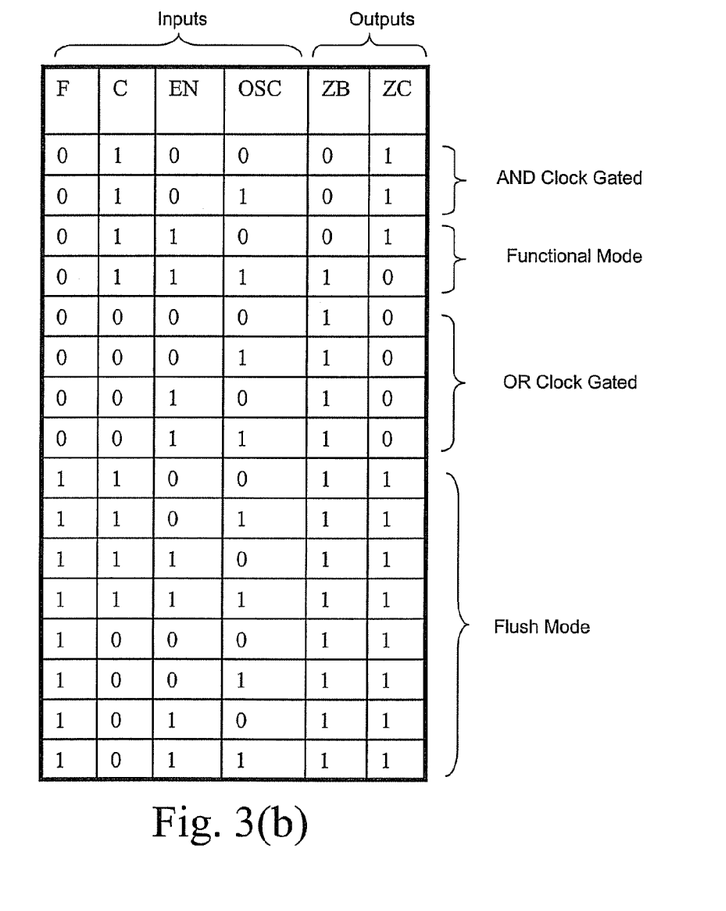
FIG. 3(b) is a truth table illustrating the operation of the novel clock splitting device shown in FIG. 3(a)

Accordingly, FIGS. 3(a) and 3(b) illustrate the operation of the modified clock splitting device 104 shown in FIG. 1. An additional input, i.e., the flush clock signal F, is presented to the modified clock splitting device 104. Whenever the value of F (generated by the sequence controller 108) is logic 0, the architecture operates in a conventional manner, including one of a functional pipeline mode, non-functional AND clock gating, and OR clock gating. This is reflected in the upper portion of the truth table shown in FIG. 3(b). However, due to the OR gate logic included within modified clock splitting device 104, whenever the value of F is logic high (indicating a decision to flush data through a selected latch stage) the value of both the B clock and C clock are held high, regardless of the value of the other three inputs. This condition results in each latch stage (to which the high flush signal is applied) becoming transparent and passing the data through.

Figure 4:
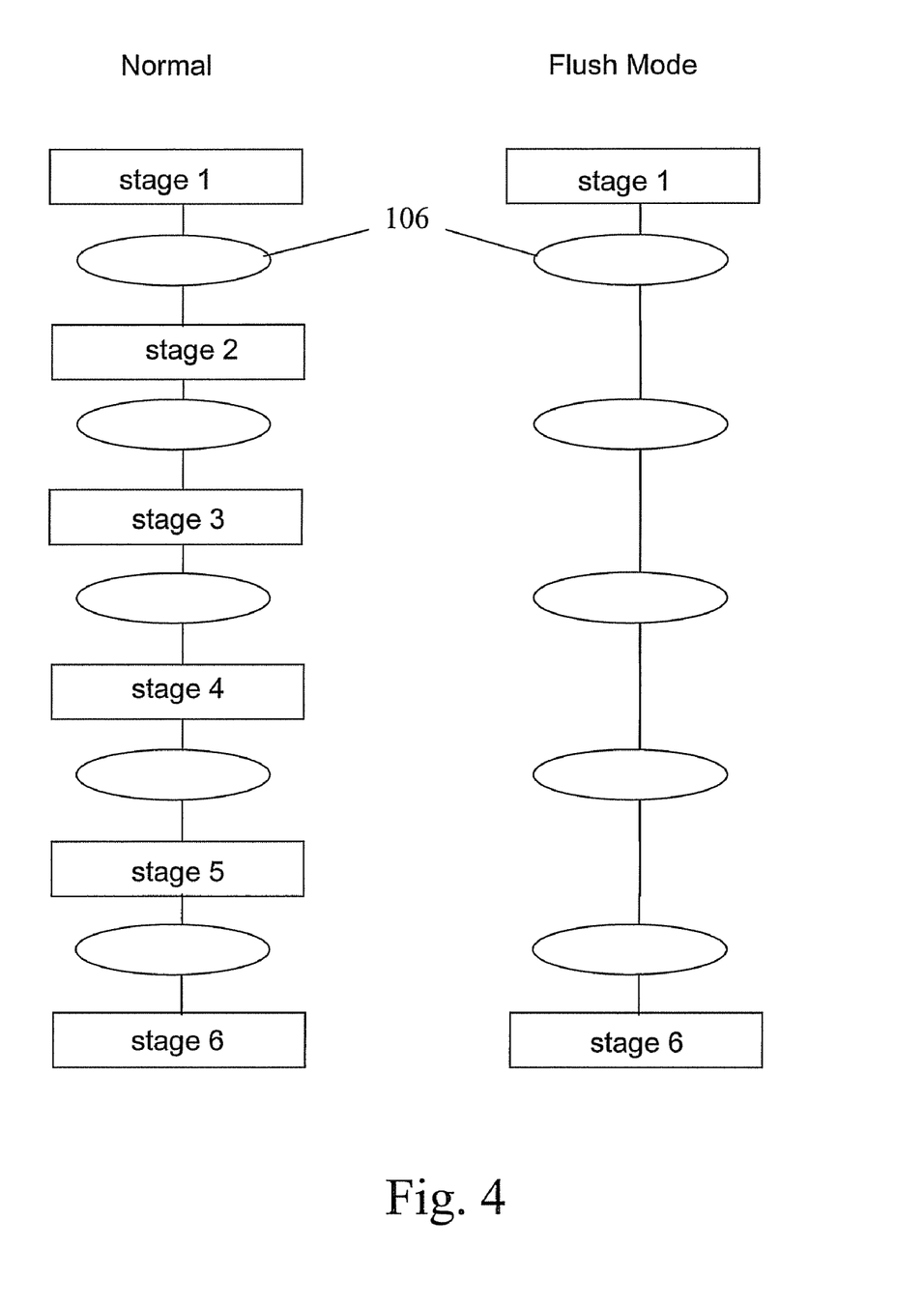
FIG. 4 is a flow diagram illustrating a comparison between a normal mode of pipeline operation with a flush mode operation.

It can therefore be appreciated that by selectively applying a high flush signal to one or more latch stages, data can be propagated through the flushed stages without individual clocking thereof. FIG. 4 illustrates a side-by-side comparison of normal operation and flush mode operation of an exemplary six-stage pipeline architecture. During normal operation, each individual latch stage 1-6 is clocked, as indicated in the left column of FIG. 4. In contrast, where a flush signal is applied to the associated clock splitting devices of latch stages 2-5, both the B and C clock thereof are held high, thereby creating a virtual short through the stages. As a result, data output from stage 1 is flushed through the (optional) combinational logic stages 106 between latch stages, directly to stage 6 as shown in the left column of FIG. 4. Again, the specific number of stages flushed depends upon the outputs of the state machine 110 and sequence controller 108. Once normal pipelining is again desired, all flush signals are deactivated, and the architecture again is represented by the right column of FIG. 4.

Figure 5:
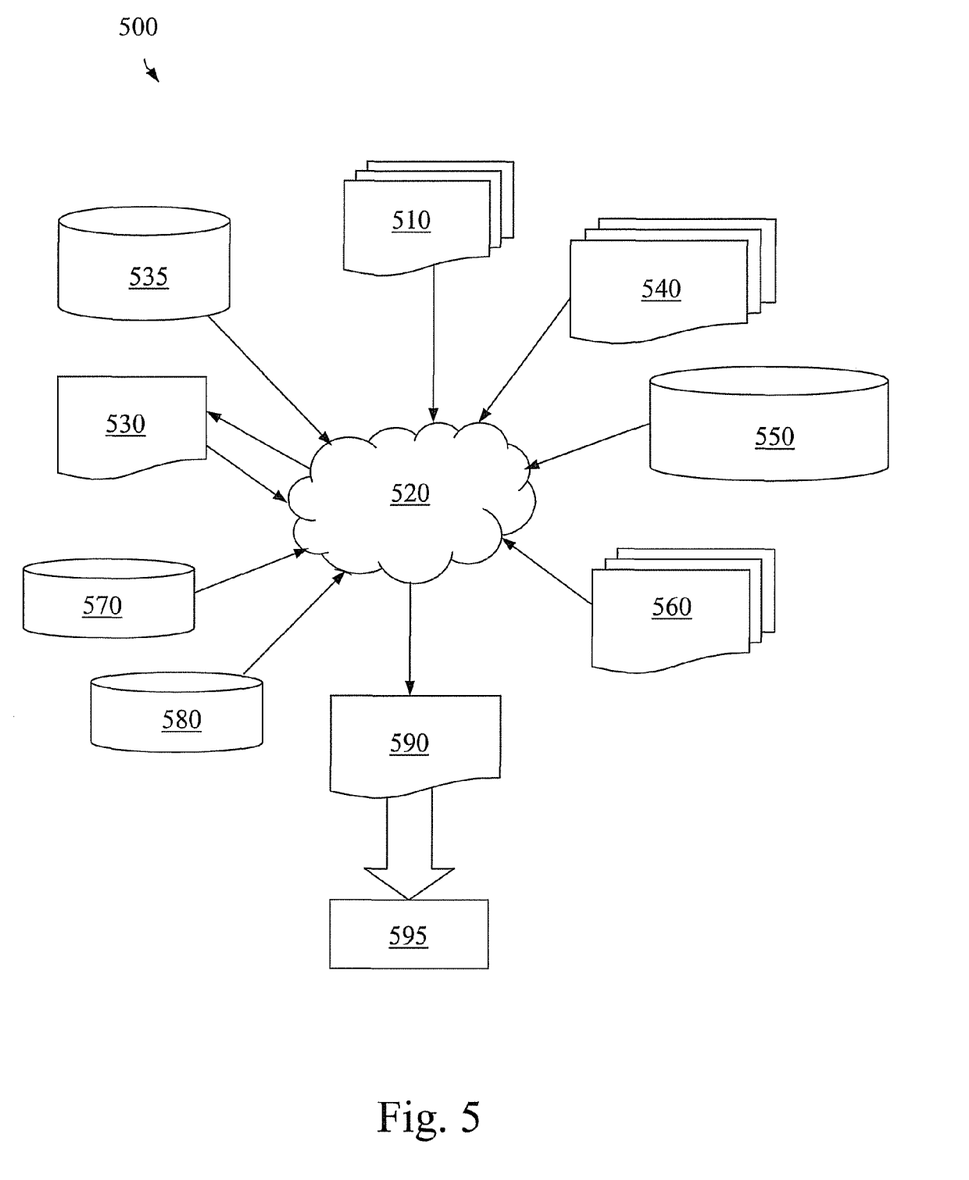
FIG. 5 is a flow diagram of an exemplary design process used in semiconductor design, manufacturing, and/or test.

FIG. 5 is a block diagram illustrating an example of a design flow 500. Design flow 500 may vary depending on the type of IC being designed. For example, a design flow 500 for building an application specific IC (ASIC) will differ from a design flow 500 for designing a standard component. Design structure 510 is preferably an input to a design process 520 and may come from an IP provider, a core developer, or other design company or may be generated by the operator of the design flow, or from other sources. Design structure 510 comprises circuit embodiments 100, 104 in the form of schematics or HDL, a hardware-description language, (e.g., Verilog, VHDL, C, etc.). Design structure 510 may be contained on one or more machine readable medium(s). For example, design structure 510 may be a text file or a graphical representation of circuit embodiments 100, 104. Design process 520 synthesizes (or translates) circuit embodiments 100, 104 into a netlist 530, where netlist 530 is, for example, a list of wires, transistors, logic gates, control circuits, I/O, models, etc., and describes the connections to other elements and circuits in an integrated circuit design and recorded on at least one of machine readable medium 515. This may be an iterative process in which netlist 530 is resynthesized one or more times depending on design specifications and parameters for the circuit.

Design process 520 includes using a variety of inputs; for example, inputs from library elements 535 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 580, which may include test patterns and other testing information. Design process 520 further includes, for example, standard circuit design processes such as timing analysis, verification tools, design rule checkers, place and route tools, etc. One of ordinary skill in the art of integrated circuit design can appreciate the extent of possible electronic design automation tools and applications used in design process 520 without deviating from the scope and spirit of the invention. The design structure of the invention embodiments is not limited to any specific design flow.

Design process 510 preferably translates embodiments of the invention as shown in FIGS. 1 and 3(a), along with any additional integrated circuit design or data (if applicable), into a second design structure 590. Second design structure 590 resides on a storage medium in a data format used for the exchange of layout data of integrated circuits (e.g. information stored in a GDSII (GDS2), GL1, OASIS, or any other suitable format for storing such design structures). Second design structure 590 may comprise information such as, for example, test data files, design content files, manufacturing data, layout parameters, wires, levels of metal, vias, shapes, data for routing through the manufacturing line, and any other data required by a semiconductor manufacturer to produce embodiments of the invention as shown in FIGS. 1 and 3(a). Second design structure 590 may then proceed to a stage 595 where, for example, second design structure 590: proceeds to tape-out, is released to manufacturing, is released to a mask house, is sent to another design house, is sent back to the customer, etc.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A design structure embodied in a machine readable, non-transitory storage medium used in a design process, the design structure comprising:
    a netlist describing a system for dynamically varying the pipeline depth of a computing device, depending upon at least one of computing function and workload, the system further comprising a state machine configured to determine an optimum length of a pipeline architecture based on a processing function to be performed;
    a pipeline sequence controller, responsive to the state machine, the pipeline sequence controller configured to vary the depth of the pipeline based on the determined optimum length;
    a plurality of clock splitter elements, each associated with a corresponding plurality of latch stages in the pipeline architecture, the clock splitter elements coupled to the pipeline sequence controller and adapted to, independently, from one another, operate in a functional mode, one or more clock gating modes, and a pass-through flush mode;
    wherein, for each of the clock splitter elements operating in the pass-through flush mode, data is passed through the associated latch stage without oscillation of clock signals associated therewith; and
    wherein, for a given function type, the state machine, pipeline sequence controller and local clock splitter elements are further configured to, in cooperation with one another, dynamically increase the depth of the pipeline so as to add pipeline stages, thereby accommodating multiple repeating instances of the given function type in the event the function type is not already pipelined, and to dynamically reduce the depth of the pipeline so as to remove pipeline stages in the event the given function type is not being repeated, with a case of a single use function type versus a multiple repeating function type determined by a system compiler that looks ahead to an instruction stream and determine whether a function pipeline set is repeatedly or singly used.

2. The design structure of claim 1, wherein the plurality of latch stages each comprises a level sensitive scan design having a first stage and a second stage.

3. The design structure of claim 1, wherein the plurality of clock splitter elements comprise logic which receives, as inputs thereto, a local clock control signal, a system clock signal, an enable signal and a flush signal, wherein the flush signal is an output of the pipeline sequence controller.

4. The design structure of claim 3, wherein: whenever the flush signal is in a deactivated state, the clock splitter operates in one of the functional mode or clock gating modes, depending on the value of the local clock control signal and the enable signal.

5. The design structure of claim 4, wherein: whenever the flush signal is in an activated state, the clock splitter operates in the pass-through flush mode, regardless of the value of the local clock control signal, the system clock signal, and the enable signal.

6. The design structure of claim 3, wherein the plurality of clock splitter elements generate first and second clock signals for the associated latch stage.

7. The design structure of claim 6, wherein:
in the functional mode, the first and second clock signals oscillate as the logical inverse of one another;
in the one or more clock gating modes, the first clock signal is held at one logic level and the second clock signal is held at the opposite logic level; and
in the pass-through flush mode, both the first and second clock signals are held at logic high.

8. The design structure of claim 1, wherein the design structure resides on storage medium as a data format used for the exchange of layout data of integrated circuits.

9. The design structure of claim 1, wherein the design structure includes at least one of test data files, characterization data, verification data, programming data, or design specifications.

* * * * *